(12) United States Patent
Stilo et al.

(10) Patent No.: US 9,295,106 B2
(45) Date of Patent: Mar. 22, 2016

(54) SAFETY TIMER FOR COOKING APPLIANCE

(71) Applicant: PIONEERING TECHNOLOGY CORP., Mississauga (CA)

(72) Inventors: Tom Stilo, Etobicoke (CA); Wayne Zu, Mississauga (CA)

(73) Assignee: PIONEERING TECHNOLOGY CORP., Mississauga (CA)

( * ) Notice: Subject to any disclaimer, the term of this patent is extended or adjusted under 35 U.S.C. 154(b) by 339 days.

(21) Appl. No.: 13/770,422

(22) Filed: Feb. 19, 2013

(65) Prior Publication Data

US 2014/0230661 A1   Aug. 21, 2014

(51) Int. Cl.
 *H05B 1/02* (2006.01)
 *F16K 37/00* (2006.01)

(52) U.S. Cl.
 CPC .......... *H05B 1/0225* (2013.01); *F16K 37/0025* (2013.01)

(58) Field of Classification Search
 CPC ... F24C 7/087; H05B 1/0225; Y10T 307/944; Y10T 307/951
 USPC ................. 219/490, 482, 483, 489, 506, 721; 99/332; 307/141, 141.1, 140
 See application file for complete search history.

(56) References Cited

U.S. PATENT DOCUMENTS

| 5,608,383 | A | * | 3/1997 | Neil | 340/588 |
| 5,854,520 | A | * | 12/1998 | Buck et al. | 307/141 |
| 7,816,818 | B2 | | 10/2010 | Sellecchia | |
| 2009/0017404 | A1 | * | 1/2009 | White et al. | 431/12 |

* cited by examiner

*Primary Examiner* — Jianying Atkisson
(74) *Attorney, Agent, or Firm* — Bereskin & Parr LLP/S.E.N.C.R.L., s.r.l.

(57) ABSTRACT

A safety timer device, for a cooking appliance connected to an energy source, the cooking appliance having a heat generating component in communication with a heat controller. A timer communicates with the heat controller configured to count down a predetermined cooking time. An alarm unit, in communication with the timer, is configured to communicate an alarm signal for a predetermined alarm time after the cooking time expires. An ON/OFF device in communication with the timer, the energy source and the heat generating component, is configured to disconnect the energy source from the heat generating component after the alarm time expires. A reset device in communication with the timer, the alarm unit and the ON/OFF device configured to reset the timer to the predetermined cooking time, terminate the alarm signal after the cooking time expires, and reconnect the energy source with the heat generating component after the alarm time expires.

19 Claims, 6 Drawing Sheets

FIG. 6

SAFETY TIMER FOR COOKING APPLIANCE

TECHNICAL FIELD

The invention relates to a safety timer device, for a cooking appliance such as a stove top with burners, to prevent unattended use of the appliance, except for predetermined safe time periods, thus reducing a common fire risk from cooking.

BACKGROUND OF THE ART

The most common cause of residential fires is unattended cooking where the user fails to properly attend to cooking because they are distracted, forgetful, drawn away by some emergency or simply careless. Fires can start for example, when cooking oil ignites within a hot vessel, or when oil spills onto the hot cooking element surface, or when contents of a pot dry out and ignite or when adjacent flammable materials come into contact with hot surfaces. Of particular risk are cooking appliances used by the elderly who experience memory lapses or by inexperienced cooks unfamiliar with the risks.

A prior art approach to reducing the fire risk uses a stove dial timing device to prompt the user to return to the stove periodically to monitor the cooking process. An example is described in U.S. Pat. No. 7,816,818 that uses a control dial with a built-in timer and audible alarm. The timer emits an audible alarm at a regular interval to remind the user to return to the stove periodically, to turn off the alarm and therefore reduce the likelihood of fires caused by unattended cooking.

There are shortcomings of the prior art described in U.S. Pat. No. 7,816,818 as follows. The timer is set to a fixed time regardless of the heat output of the burner. The timer relies on the user to set the fixed time through the selection of a mode of operation. This is likely to cause incorrect times to be set or the function may be ignored completely. A default time may be selected that is inappropriate for the food material being cooked. For example, frying in oil at high temperature settings can be especially dangerous if unattended even for a short period. The oil can ignite at high heat or oil can splatter and ignite on hot adjacent surfaces. Therefore unattended cooking, with oil at high heat is inherently much more likely to create a fire hazard quickly, whereas simmering a pot of liquid at low heat is much less likely to cause a fire.

The alarm in U.S. Pat. No. 7,816,818 is located within the timer dial which has limited space available on the stove panel surface and the size limits the maximum volume due to space constraints created by the accompanying speaker, warning lights, battery and circuit boards. Elderly users with impaired hearing for example may not be able to hear the alarm if they have left the kitchen area. Noise from televisions or radios in other rooms may mask the sound of an alarm emitted from a cooking appliance at a distance away from the user. The timer dial in U.S. Pat. No. 7,816,818 relies on mechanical buttons for setting and resetting of the timer. Mechanical buttons are unreliable in an environment where they will be exposed to steam and oil vapour from the cooking process. Mechanical parts may corrode or receive oil mist that attracts dust which clogs the moving parts.

Most noticeably, the timer dials in U.S. Pat. No. 7,816,818 are independent from each other and are not coordinated with each other. Where several burners are used simultaneously for cooking, multiple alarms will be activated independently depending on when the burner and timer was turned on. This will cause significant annoyance to the user who will be bombarded by multiple alarms and will be required to return to the stove every few minutes to reset a timer dial. This independent feature alone may prompt users to abandon use of the timer dials altogether.

Further the device in U.S. Pat. No. 7,816,818 is an alarm only which can be ignored or may not be heard by the user. If the user does not respond to the audible alarm the device in U.S. Pat. No. 7,816,818 has no ability to take further action to prevent a fire. If a user completely neglects the cooking process, for example, has a heart attack, falls or has an emergency situation to deal with, the stove continues to operate and presents a significant fire risk especially for elderly users, diabetics and other users with major health risks.

Features that distinguish the present invention from the background art will be apparent from review of the disclosure, drawings and description of the invention presented below.

DISCLOSURE OF THE INVENTION

The invention provides a safety timer device, for a cooking appliance connected to an energy source, the cooking appliance having a heat generating component in communication with a heat controller, the device comprising: a timer in communication with the heat controller configured to count down a predetermined cooking time; an alarm unit, in communication with the timer, configured to communicate an alarm signal for a predetermined alarm time after the cooking time expires; an ON/OFF device in communication with the timer, the energy source and the heat generating component, configured to disconnect the energy source from the heat generating component after the alarm time expires; and a reset device in communication with the timer, the alarm unit and the ON/OFF device configured to reset the timer to the predetermined cooking time, terminate the alarm signal after the cooking time expires, and reconnect the energy source with the heat generating component.

Also provided is a safety timer device, for a cooking appliance connected to an energy source, the cooking appliance having a heat generating component in communication with a heat controller, wherein the heat controlling device has a plurality of settings to vary heat output, the device comprising: a timer in communication with the heat controller; an alarm unit, in communication with the timer; an ON/OFF device in communication with the timer, the energy source and the heat generating component; a reset device in communication with the timer, the alarm unit and the ON/OFF device; and an electronic control system including at least one microprocessor configured to: detect when the heat controller is activated; sense the setting of the heat controller; retrieve data from a memory storage device to set a predetermined cooking time corresponding to the setting of the heat controller; activate the timer to count down the predetermined cooking time; activate the alarm unit, after the cooking time expires, to communicate an alarm signal for a predetermined alarm time; activate the ON/OFF device, after the alarm time expires, to disconnect the energy source from the heat generating component; and on activation of the reset device, to reset the timer to the predetermined cooking time corresponding to the setting of the heat controller, terminate the alarm signal, and reconnect the energy source with the heat generating component.

The example of a safety timer device described below and illustrated in the accompanying drawings has a removable electronic dial with an integral rotary position sensor, data processor, radio frequency transmitter and battery. The electronic dial is mounted on the stove control panel in place of the original hollow plastic/metal dial as manufactured. Of course the safety timer components can be included in the stove when manufactured within the other electronic control systems of the stove. In the example described herein, the timer and alarm unit is disposed on a wall away from the stove to be better heard at a distance and also to avoid cooking vapours and fumes. The wall mounted timer and alarm unit receives signals from the radio frequency transmitter of the electronic dial wirelessly and notifies the user through the use of an audible alarm when the predetermined cooking time set for a burner heat output is exceeded. The electronic dial has a sensor capable of detecting the dial angle of rotation and wirelessly transmits the rotary position of the dial to the timer control system housed in the alarm unit. The timer unit receives rotary position signals from each of the electronic dials on the stove, determines which burner has the lowest time setting and sets the minimum cooking time. When the minimum cooking time for the active dials is exceeded, the timer activates the alarm unit to sound an alarm and signal that the user should return to the stove. All of the electronic dials have a touch sensitive reset switch that, when touched, transmit a wireless RF signal to the timer and alarm unit to signify that the user has returned to the stove. On receipt of the signal, the alarm is terminated and the timer is reset to the minimum cooking time for the active dials. The process repeats until the user turns off all active electronic dials and the corresponding burners are turned off. The electronic dials remain powered by their batteries consuming minimal power while remaining in sleep mode to be automatically activated when the dial is rotated out of the OFF position.

DESCRIPTION OF THE DRAWINGS

In order that the invention may be readily understood, one example embodiment of the safety timer device is illustrated by way of example in the accompanying drawings.

Further details of the invention and its advantages will be apparent from the detailed description included below.

DETAILED DESCRIPTION OF PREFERRED EMBODIMENTS

Figure 1:
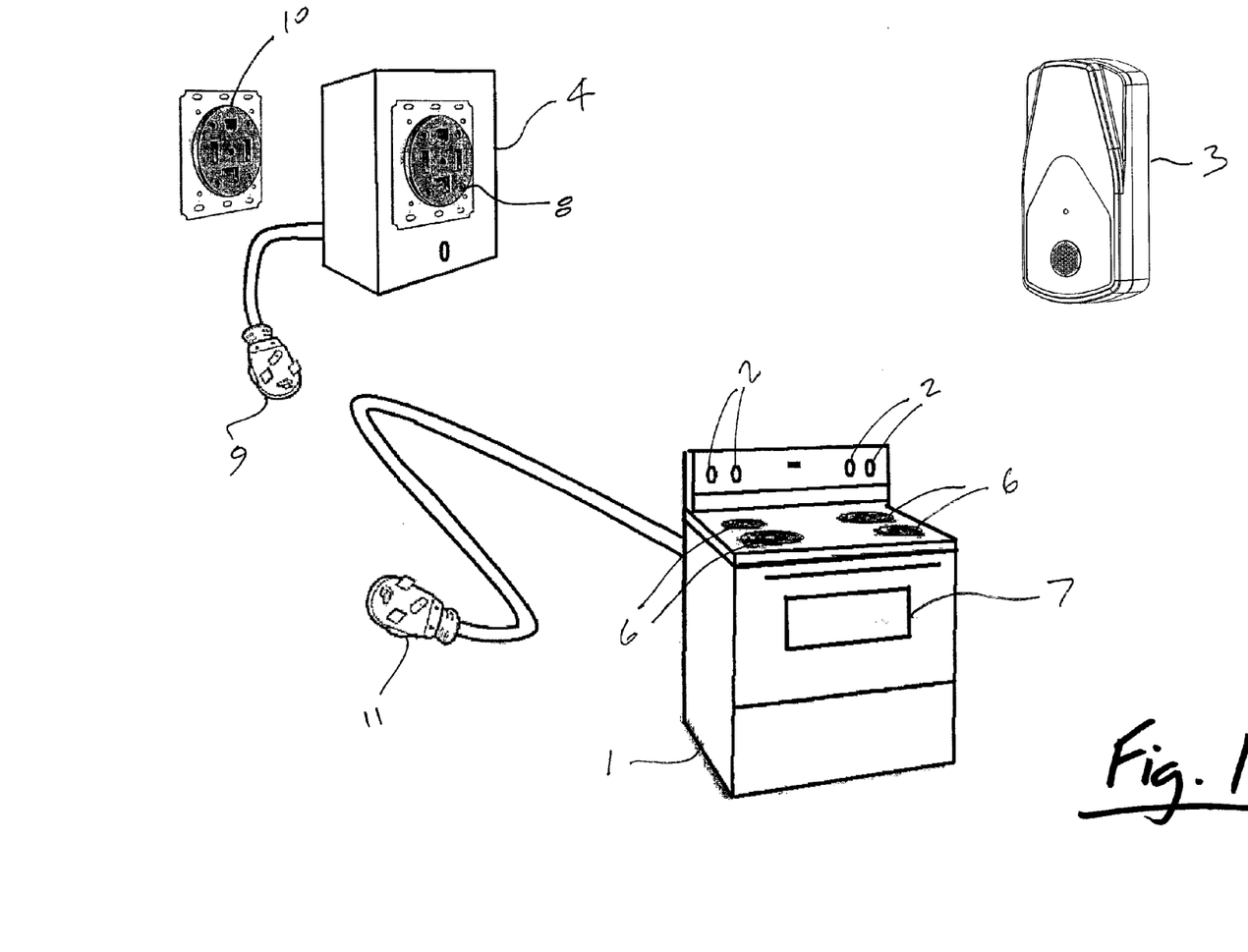
FIG. 1 is a schematic diagram showing an example of the safety device applied to a conventional electric stove, where the safety device includes electronic control dials on the stove, a wall mounted timer and audible alarm unit, and between the stove power cord and a wall outlet showing an electric power ON/OFF device.

FIG. 1 shows schematically the main components of the safety timer device when applied to an electric stove 1, namely, the electronic dials 2, the remote timer and alarm unit 3 and the electric power ON/OFF device 4.

Figure 2:
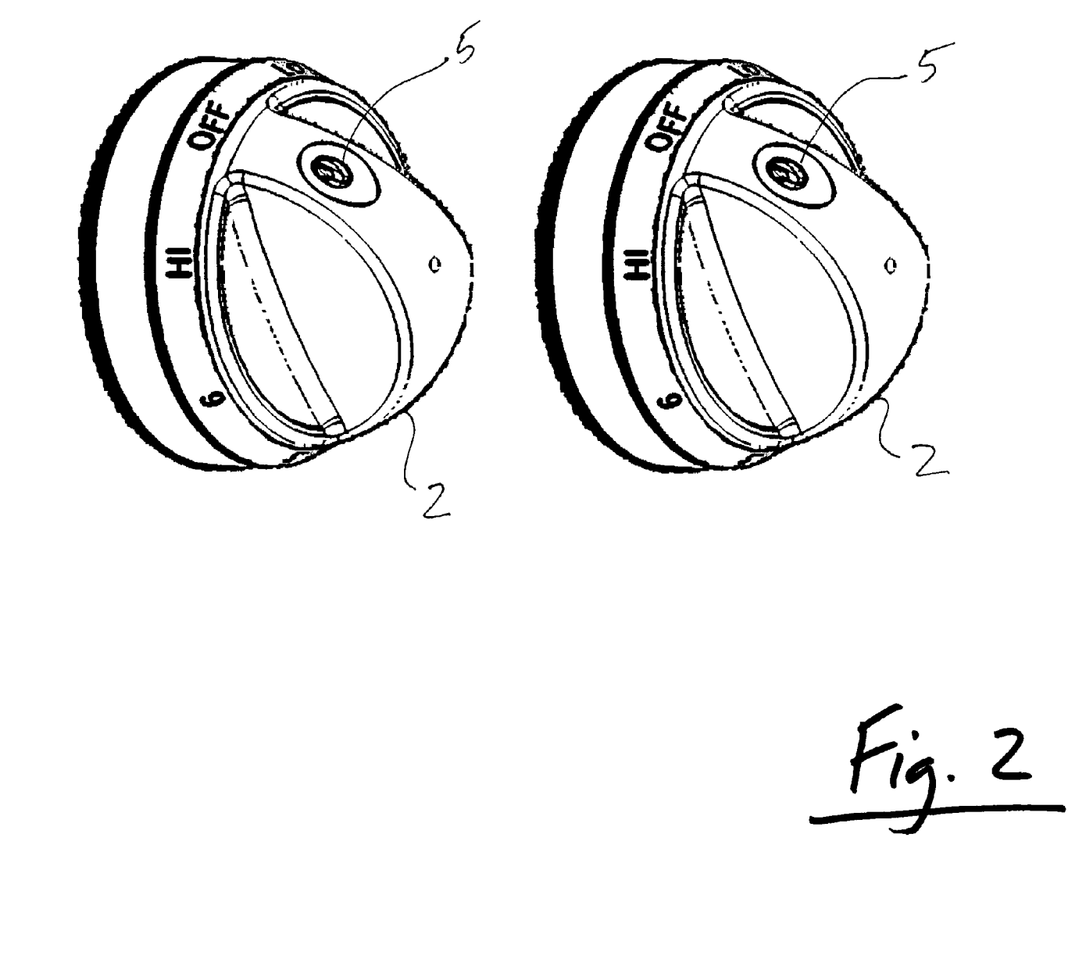
FIG. 2 is a perspective view of two electronic dials from the electric stove shown in FIG. 1.

FIG. 2 illustrates two example electronic dials 2 that are advantageously designed to replace the existing original dials on an electric stove 1. Original hollow plastic/metal dials are mounted on a standard rotating shaft with a flat portion so that standardized dials can be easily removed for cleaning or replacement if damaged.

The illustrated example shows retrofitting of electronic dials 2 to replace the original plastic dials. The electronic dials 2 have an LED light 5 that can visually indicate when the dial 2 is operational, can rapidly flash as an alarm signal and slowly flash to indicate low battery conditions. Each electronic dial 2 houses a microprocessor, a radio frequency (RF) transmitter, a touch sensor for activating the reset device and a rotary angle sensor, all powered by a compact battery. The alarm unit 3 contains a timer, a microprocessor, a radio frequency (RF) receiver and an alarm device with a speaker, a flashing light or vibration generator. The timer and alarm unit 3 is shown as a wall mounted unit which could be battery powered or hard wired, but the timer and alarm unit 3 could take the form of a battery powered bracelet or necklace that vibrates for example.

Although the example illustrated and described herein relates to a rotary electronic dial 2, a separate timer and alarm unit 3, and a separate ON/OFF device that communicate by radio transmissions, it will be understood that the safety timer can also be built as a single component or integrated into the circuits of the stove 1 when manufactured to include sensors, an electronic timer, alarm unit and ON/OFF device that are housed within the stove 1 and are hard wired together. Also it will be understood that the timer, alarm unit and ON/OFF device may be simple mechanical devices rather than electronic devices. For example, a mechanical egg timer is a commonly known kitchen device that includes a timer and alarm. A mechanically operated ON/OFF device such as an electric power switch or circuit breaker could be combined with a mechanical timer and alarm to produce the equivalent result compared to the electronic system described herein.

The electronic dial 2 being a rotary handle, uses a rotary angle sensor to determine the rotary position of the dial 2, for example at OFF, low (LO), medium (MED) and high (HI) heat settings. An example of a rotary angle sensor is a magnetic sensor in the timer dial 2 and a stationary magnet mounted on the panel surface of the stove 1 beneath the timer dial 2. If the electronic dial 2 is not in the OFF position, the dial 2 senses motion and is activated from the sleep mode. The rotary angle "$\theta$" is measured and transmitted by a radio frequency transmitter in the dial 2 to the timer and alarm unit 3. In addition, the dial 2 has a touch sensor to communicate with the timer and activate the reset device. The touch sensor and radio frequency transmitter in the dial 2 transmit a signal to the timer and alarm unit 3 each time the dial 2 is touched by the user to signal to the timer and alarm unit 3 that the user is attending to the cooking.

Figure 6:
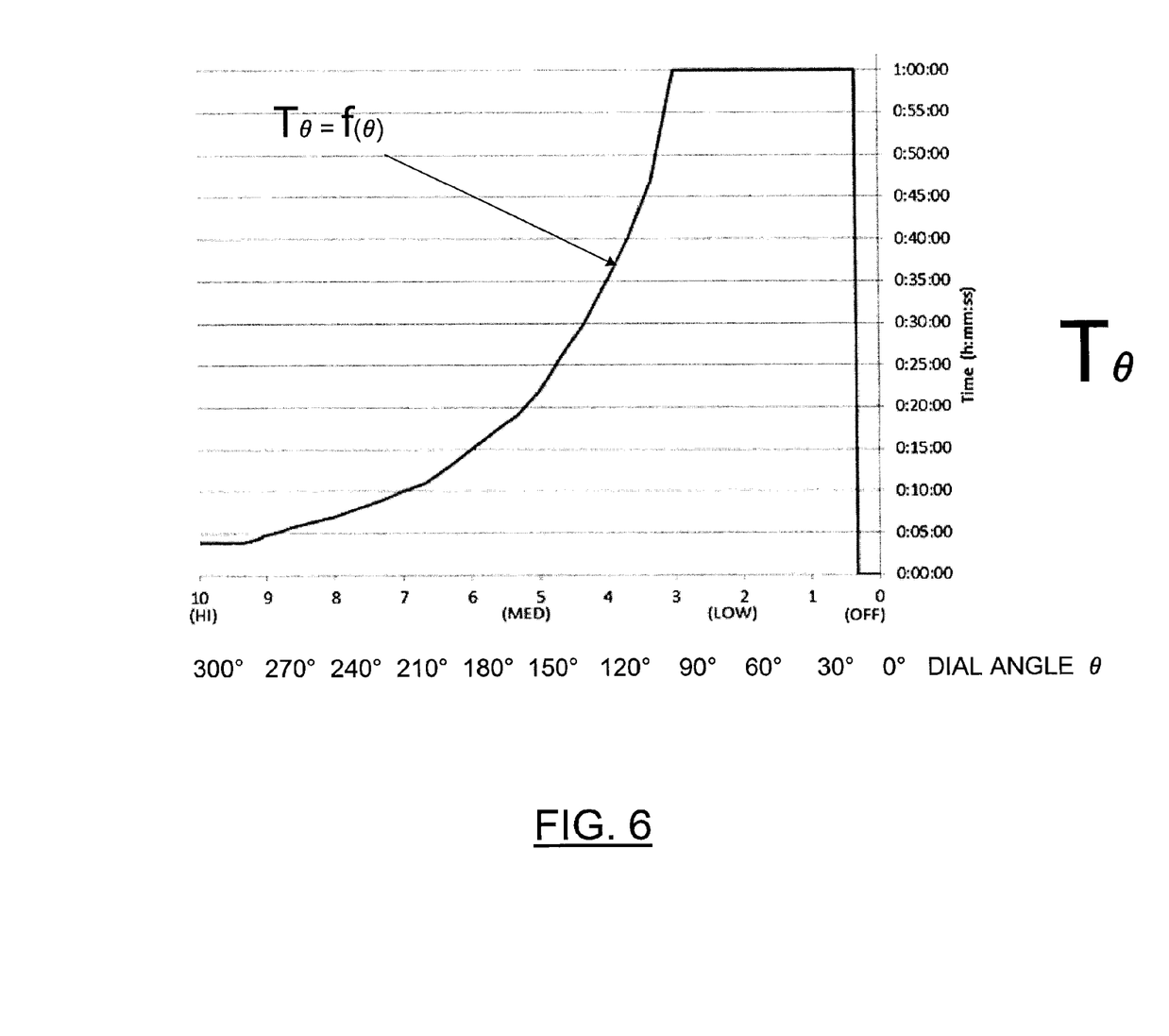
FIG. 6 is a chart showing an example of an empirically established relationship between the predetermined cooking time ($T_\theta$) and electronic dial settings/rotary angles, with 60 minutes unattended cooking time being the maximum allowed and 4 minutes at the maximum heat output (HI) being the minimum allowed before the alarm unit is activated.

The timer and alarm unit 3 receives the angle position $\theta$ from the electronic dial 2, which corresponds to the heat setting of the associated stove burner 6. The angle position $\theta$ is then used to determine the predetermined cooking time $T_\theta$ setting for the timer. Appropriate timer settings are determined through empirical methods such as illustrated in FIG. 6. The chart in FIG. 6, stored as data in memory of the electronic dial 2, provides the timer with a maximum predetermined cooking time $T_\theta$ allowed of 60 minutes when the lower range of heat settings is detected, and a graduated range towards a minimum predetermined cooking time $T_\theta$ of 4 minutes for the maximum high heat setting. Different stoves 1 or cook tops will have different rotary positions for heat settings (for example: 1-10, 0°-300°) and other stoves have touch sensitive electronic controls. It will be understood that the rotary dial is an example only and that other means of detecting the heat setting and identifying a corresponding predetermined time $T_\theta$ are within the scope of the invention, such as an electronic processor that accesses data stored in memory or calculates the predetermined time $T_\theta$ by inputting the heat setting into an algorithm.

In the case where several burners 6 are in use simultaneously, the timer and alarm unit 3 will receive angle positions θ from the radio transmitters of each active electronic dial 2. The timer and alarm unit 3 includes an electronic processor to keep track of the position θ of each dial 2 using the unique serial number of each dial 2 which is included in the radio transmission. To avoid forcing the user attend to the cooking more than necessary, due to the different settings of each dial 2, the processor in the timer and alarm unit 3 will determine which electronic dial 2 (and associated burner) requires the most attention, having the lowest amount of time left to countdown, and set the timer to the appropriate minimum time ($T_{min}$) as the allowed time ($T_\theta$) for that dial 2. When that dial 2 is turned OFF the alarm unit 3 will use the allowed time ($T_\theta$) of the remaining active dials 2 to determine the new minimum time ($T_{min}$) for the timer setting. This process continues until all active dials 2 are turned OFF and returned to sleep mode. Because all the dials 2 are coordinated, when the user returns to the stove 1 the user may touch any dial 2 to signal that the cooking is being attended to. It is not necessary to touch the specific dial 2 that caused the alarm unit to activate the reset. This is especially helpful in reducing uncertainty as the user may not be sure which dial 2 caused the alarm.

Figure 3:
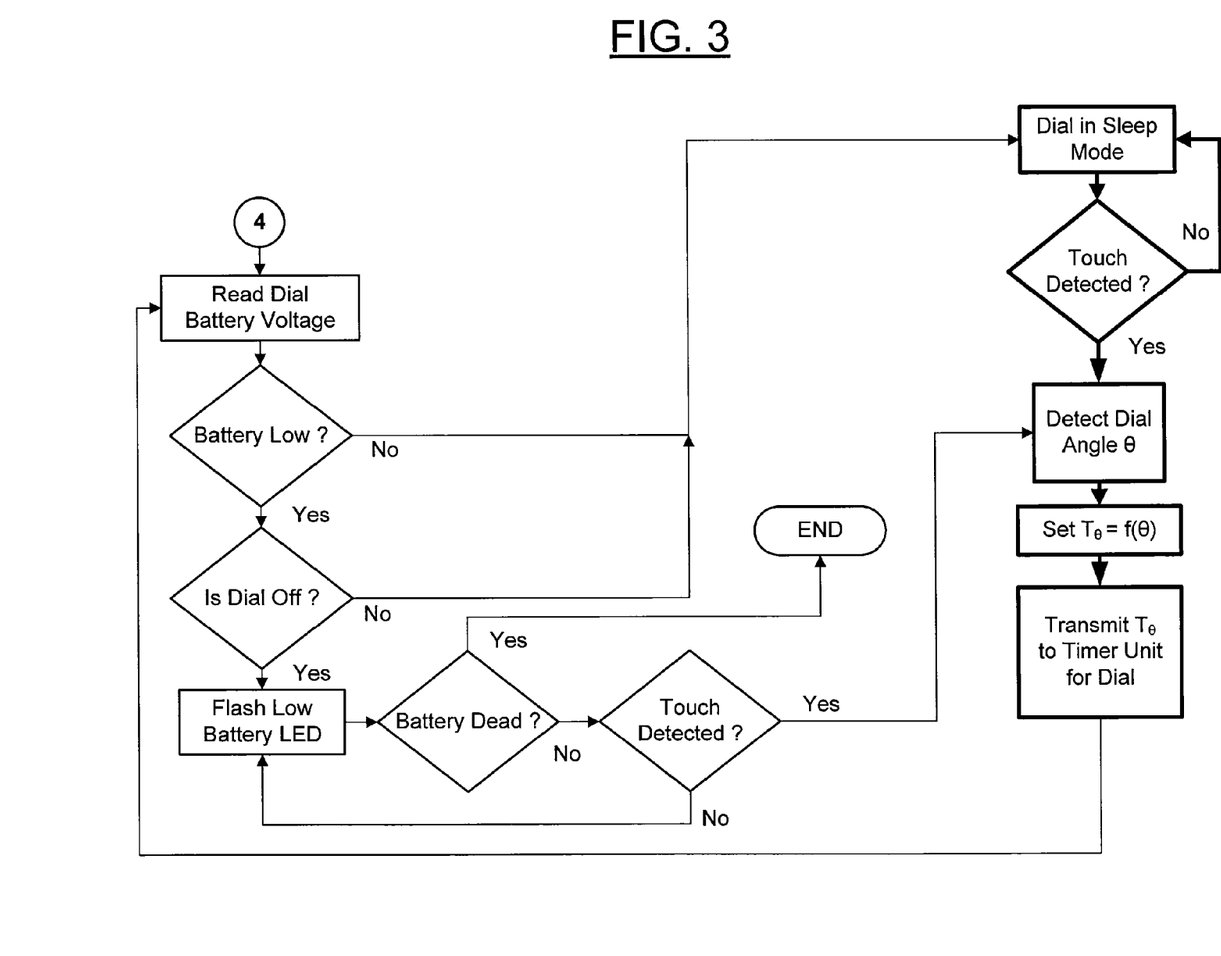
FIG. 3 is a flow chart showing the operation of a single battery powered dial to control the electric stove and communicate angular position data to the timer.

FIG. 3 shows a flow chart of the logic process operating the electronic dial 2. The left side portion of the flow chart relates to battery management while the right side relates to the detection of dial angle θ, retrieval of $T_\theta$ from memory and transmitting the information to the timer and alarm unit 3. As mentioned above, each of the electronic dials 2 on the stove 1 includes several separate internal components to accomplish these results, namely, an integral rotary position sensor, data processor, radio frequency transmitter and battery (not illustrated).

Referring to FIG. 3 the electronic dial 2 remains powered up at all times, since the user may access the stove 1 any time and to ensure safety, the device does not rely on positive steps from the user to activate. The dial battery voltage is read and if not below a minimal required voltage the dial returns to sleep mode. When the user touches and rotates the dial 2, the rotary sensor detects the angle θ, the data processor determines the predetermined cooking time $T_\theta$ for that angle θ, and the RF transmitter transmits the signal to the wall mounted timer alarm unit 3. The signal includes identification of the dial by serial number and the value of $T_\theta$. After transmission is complete, the dial 2 remains positioned at angle θ and returns to sleep mode unless touched again by the user.

As indicated in the flow chart of FIG. 3 on the left side, when the dial is turned to an OFF position and when battery is low, the LED 5 (see FIG. 2) on the dial 2 will flash to give a visible warning. However the power consumption of the electronic dial 2 is low and it can operate on a low battery. Therefore if the dial 2 is touched when flashing a low battery warning, the dial will be activated out of sleep mode and will detect angle θ and transmit $T_\theta$ as described above.

Figure 4:
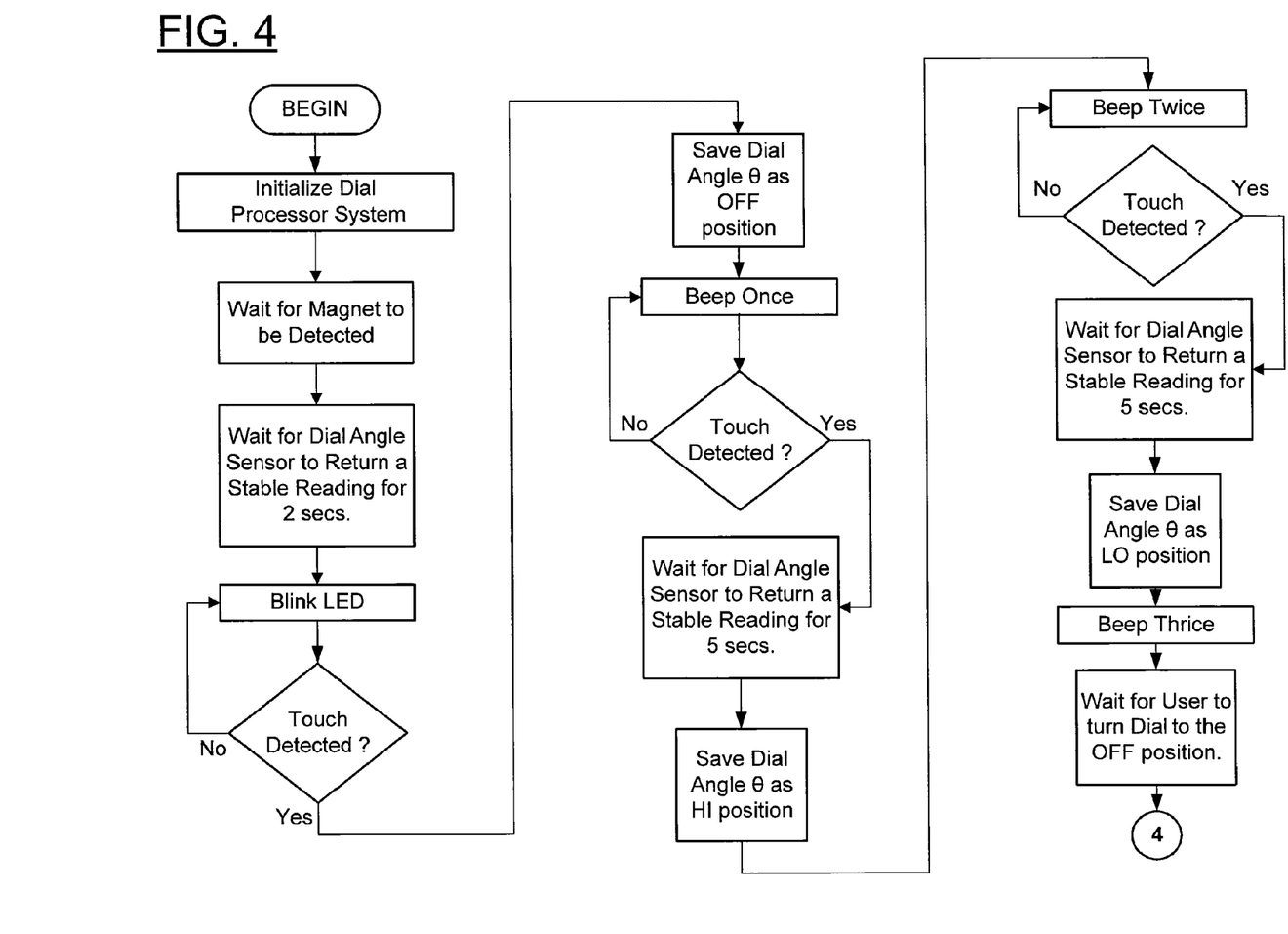
FIG. 4 is a flow chart showing the operation of the electronic dial in learning mode to establish the angular positions corresponding to OFF and HI settings.

FIG. 4 shows a flow chart of the learning process by which a standardized electronic dial 2 can be taught the OFF and HI rotary positions when mounted on any stove 1. The capability to learn or be programmed to suit any stove 1 is particularly important when the safety timer is to be applied to existing stoves 1 that the user owns. By adapting to any existing stove 1, the commercial prospects for the safety timer are enhanced. Each electronic dial 2 has a magnetic sensor and the user installs a magnetic label on the stove panel beneath the dial 2. The sensor can detect the rotary position of the dial relative to the stationary magnet. Other sensors could include rotary encoders or optical sensors.

Referring to FIG. 4, the learning mode begins when a new battery is installed and the electronic dial 2 is powered up. The dial processor waits until the dial angle sensor returns a stable reading for 2 seconds. This ensures that the user is no longer moving the dial. The LED 5 blinks to confirm the status and if not touched, the dial angle is saved as the OFF position of the dial 2. The dial 2 beeps to confirm the saved data and then the user rotates the dial to the HI position of the stove burner. If not touched again the dial processor waits until the dial angle sensor returns a stable reading for 5 seconds. The dial angle is saved as the HI position and the dial beeps twice to confirm the saved data. The user then turns the dial 2 to the lowest position LO. If not touched again the dial processor waits until the dial angle sensor returns a stable reading for 5 seconds. The dial angle is saved as the LO position and the dial beeps thrice to confirm the saved data. The user then turns the dial 2 to the OFF position and learning is completed. The dial 2 then returns to the sleep mode. As indicated by FIG. 6, once the OFF, LO and HI positions for dial angle θ are established and saved, the remainder of the curve can be extrapolated proportionally.

Figure 5:
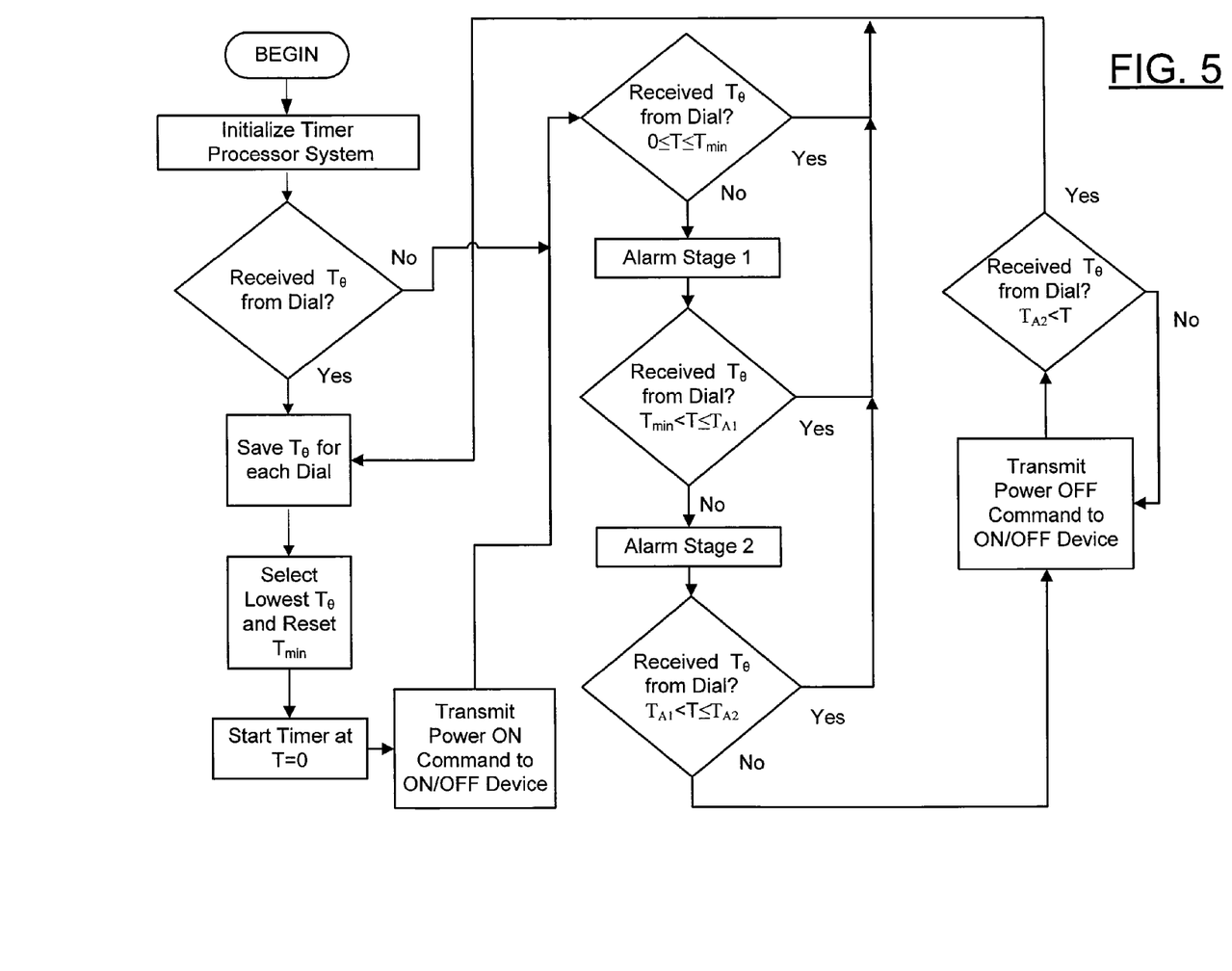
FIG. 5 is a flow chart showing the operation of the timer receiving data from each electronic dial and cooperating to control the electric stove with the alarm unit, ON/OFF device and reset unit.

FIG. 5 illustrates the logic process where the timer and alarm unit 3 receives transmissions from the dials 2 and counts down the predetermined unattended maximum cooking time $T_\theta$ before activating an alarm or finally shutting power off. The timer and alarm unit 3 preferably is located away from the stove 1 to avoid heat, vapours and grease as well as to be more readily heard or seen by users when they are not in the immediate area of the stove 1. The timer and alarm unit 3 has a battery, a processor, audio or visual alarms, a radio frequency receiver to receive signals from the dials 2, and an RF transmitter to transmit signals to the ON/OFF device 4.

The timer and alarm unit 3 receives signals from the dials 2 regarding the dial identity and the value of $T_\theta$ sensed by the dial sensor. The values are saved for each dial 2 and the lowest value is selected as the setting for the minimum time $T_{min}$ before an alarm is activated. The selection of $T_{min}$ ensures that only one dial triggers an alarm and that dial corresponds to the highest danger level, thus the shortest allowed time as indicated in FIG. 6.

The timer is started at Time (T)=0 and countdown begins until $T=T_{min}$. During this initial period of the countdown, if any further transmissions are received from any dial 2 the data is reconsidered and the lowest value for $T_\theta$ is reset to begin the countdown again. If the user touches or rotates any dial 2, this indicates that cooking is being attended to and so safe operation is confirmed. Also if the user begins using another burner, or shuts off a burner, the safety timer is reset to the new minimum unattended cooking time $T_{min}$ and the countdown begins at that new stage.

In the event that no further signals are received between $T=0$ and $T=T_{min}$ an alarm is activated. Preferably the alarm has two stages, such as a low volume alarm stage 1 and a high volume in stage 2. If the user touches the timer dial 2 any time between the start time "0" when rotation of the timer dial begins and the predetermined cooking time "$T_\theta$" the timer is reset to countdown the lowest predetermined cooking time $T_\theta$ of all active dials which is set as $T_{min}$. However if the user does not touch any active timer dial 2 before the predetermined cooking time $T_\theta$ expires, an alarm signal is transmitted to the alarm unit and a stage 1 alarm is emitted for a the predetermined time $T_{A1}$. If the user does not touch any active timer dial 2 before the time $T_{A1}$ expires, a stage 2 alarm is emitted for a predetermined time $T_{A2}$. If the user fails to touch any active timer dial 2 before expiry of time $T_{A2}$ the ON/OFF device shuts power off.

When power is cut the audible alarm continues to sound to attract the user back to the stove 1. When the user eventually returns to the stove 1 and touches the timer dial 2 to signify that the cooking has been attended to, the power is automatically restored by the ON/OFF device.

Use of the rotational position of the retrofit timer dial 2 to estimate the power or heat output of the burner 6 has advantages. As there are many configurations of stoves 1 operating with several voltages, natural gas or propane gas, the amount of power output varies significantly from one stove 1 or burner 6 to another. In order to provide a significant degree of safety, the system is designed to assume one of the worst case scenarios, namely, an electric stove operating from 240V and using a 2600W burner element. It is unnecessary to determine the exact heat output or even to know what make or model of stove is to be retrofit, since the safety timer device operates using a standardized replaceable timer dial 2 and the timer settings are set during initial calibration of the timer dial 2 relative to the OFF and HI settings of the stove 1.

The heat energy put into the food being cooked is a function of the power output of the burner and of the time it is applied. When the food heats to the ignition point a fire will start. To provide a safety margin against the fire risk, the safety timer system is designed for the most severe worst case condition. FIG. 6 provides an example of the relationship between safe cooking time and heat input under the assumed worst case condition, namely a small amount of cooking oil within a pan placed in the center of the burner.

In order to attract the user's attention back to the stove 1 the timer and alarm unit 3 must emit sound loud enough to be heard by the user even if: the user has left the kitchen area; the user who may be watching television or distracted by some other noise generating device; or the user has diminished hearing.

For these reasons it may be beneficial to locate the timer and alarm unit 3 outside the kitchen area, for example main hall of the home. In cases where the user may have extreme difficulty hearing the timer and alarm unit 3 may comprise multiple units distributed around the home.

When a user does not return to the stove 1, after the alarm has been activated for a predetermined time, the safety timer device has the ability to shut off the stove 1 with the ON/OFF device 4 and to automatically reset the timer when dial 2 is touched establishing that the user returned to the stove 1. There is no need for the user to perform any extra step to activate the system or shut it off. The user cooks normally and need only return to the stove 1 on a regular basis to touch a dial in order to keep the cooking process operating and eliminate the triggering of alarms.

The safety timer device may be implemented as a built-in component of the stove when initially manufactured with components (timer, alarm, ON/OFF device and reset) hard wired together with the stove circuits, or may be implemented with mechanical components, however the example described herein relates to a safety timer device that can be separately purchased by a user and retrofit to any existing stove. It is contemplated that a retrofit solution will be relatively low cost and appeal directly to users who have safety concerns that are not currently addressed by conventional stoves. Safety concerns can relate to stove use by elderly users, various disabled users, or inexperienced users such as students.

Generally described, the safety timer device is applicable to any cooking appliance that is connected to an energy source, such as a 240V electric power outlet, natural gas or propane gas source. The cooking appliance has at least one heat generating component in communication with a heat controller of some description. For example a typical stove 1 has four heat generating stove top burners 6, and an oven 7. In a typical stove 1 each burner 6 and the oven 7 have separate rotatable handles or dials or electronic controls that activate and deactivate a heat controller dedicated to each heat generating component (burners 6, oven 7). Heat controllers for electric stoves can include rheostats or electronic controls while gas or propane stoves employ gas valves to control the heat generated.

The safety timer device includes a timer in communication with each heat controller configured to count down a predetermined cooking time. As suggested by the chart in FIG. 6, the safety timer device establishes a relationship between the heat setting selected by the user, in the example a rotary dial set at angle $\theta$, and the maximum predetermined cooking time $T_\theta$ during which unattended cooking is allowed before an alarm is triggered. In the example of FIG. 6, $T_\theta$ is determined by experiment using the ignition time of oil in a pan on a conventional stove and ranges between 4 and 60 minutes. The relationship between heat input and maximum predetermined cooking time $T_\theta$ could be determined using thermodynamic modeling and calculated using an algorithm where the contributing factors are known such as stove manufacturer and model type. However where the device is directed to the general market for retrofitting on a large variety of unknown stoves, it is considered more practical and safe to assume the worst case situation and then establish the range of maximum predetermined cooking time $T_\theta$ based on actual experimental test results.

As shown in FIG. 3, the timer and alarm unit 3 is in wireless RF communication with the dial 2. The timer and alarm unit 3 is configured to communicate an alarm signal for a predetermined alarm time after the cooking time $T_\theta$ expires. As indicated in the flow chart of FIG. 5, the predetermined alarm time can include two stages with two different alarms (sound, visual or vibratory) and two different time durations ($T_{A1}$ and $T_{A2}$ respectively). Also the timer and alarm unit 3 can include several separate alarm emitting devices distributed throughout a residence. In the present example of FIG. 5, the total alarm time is the combined sum of $T_{A1}$ plus $T_{A2}$.

The ON/OFF device 4 in the example of FIG. 1 is shown as a separate housing with a 240V outlet 8 on a front surface and a 240V plug 9 extending from the back surface of the housing. The ON/OFF device 4 is installed between the wall outlet 10 and the stove plug 11 in order to disconnect power when activated. The separate ON/OFF device 4 in the example illustrated is in wireless communication with the timer in the timer dials 2, with the energy source (namely the wall outlet 10) and with the heat generating component (namely the burners 6 and oven 7 via the stove plug 11). The ON/OFF device 4 is configured to disconnect the energy source (wall outlet 10) from the heat generating component (burners 6 and oven 7) after the alarm time expires. For example, the ON/OFF device 4 can include an RF receiver and an electric power switch. In the case of a gas stove, the ON/OFF device 4 may be a gas valve operated wirelessly with a solenoid in battery powered circuit with an RF receiver.

The reset device (not illustrated) may be housed in the timer dial 2 and include a touch sensitive switch in the dial 2. The reset device is in communication with the timer in the timer dial 2, the alarm unit 3 and the ON/OFF device 4 either directly hardwired or wirelessly. The reset device is configured to reset the timer to the predetermined cooking time $T_\theta$, to terminate the alarm signal after the cooking time $T_\theta$ expires, and reconnect the energy source (outlet 10) with the heat generating component (burners 6, oven 7) after the alarm time ($T_{A1}$ plus $T_{A2}$) expires.

Whether by rotary dial or by electronic means the heat controlling device of the stove usually has a plurality of step-wise or continuous settings to vary heat output of the burners 6 and oven 7. For each setting (angle $\theta$) the timer has a corresponding predetermined alarm time, for example $T_\theta$ as indicated in FIG. 6 wherein the predetermined cooking times are in the range of 4 to 60 minutes.

The timer and alarm unit 3 may emit any type of alarm signal appropriate for the installation such as: an audible alarm signal; a visual alarm signal, such as flashing lights; and a vibratory alarm signal, such as a watch band, necklace or belt holster mounted device. As noted above, the alarm signal may have multiple alarm signal stages where each stage has a different alarm stage time duration ($T_{A1}$, $T_{A2}$) where the sum of all alarm stage durations ($T_{A1}$ plus $T_{A2}$) equals the total predetermined alarm time.

Particularly in a retrofit application of the safety timer device, low cost radio frequency wireless communication can be used between components that are separated from each other such as between: the timer dial 2 and alarm unit 3; the timer dial 2 and the ON/OFF device 4; the timer dial 2 and the reset device (not illustrated); the reset device and the alarm unit 3; and the reset device and the ON/OFF device 4. However, as noted above low tech solutions still have their advantages in some situations and therefore mechanical linkages or hardwired communication may be provided between: the timer and alarm unit; the timer and the ON/OFF device; the timer and the reset device; the reset device and the alarm unit; and the reset device and the ON/OFF device.

In an electronic example suitable for most current stoves that also include electronic controls, the safety timer device may include an electronic control system including at least one microprocessor, memory and software housed in part or wholly within the timer dial 2, the alarm unit 3 and/or the ON/OFF unit 4. Alternatively a stove manufacturer may opt to include the safety timer device as a feature of the stove control circuits when a stove is initially manufactured.

The electronic control system of the safety timer device may be programmed using software to: detect when the heat controller (for burner 6 or oven 7) is activated; sense the setting of the heat controller; retrieve data from a memory storage device to set a predetermined cooking time corresponding to the setting of the heat controller; activate the timer to count down the predetermined cooking time; activate the alarm unit, after the cooking time expires, to communicate an alarm signal for a predetermined alarm time; activate the ON/OFF device, after the alarm time expires, to disconnect the energy source from the heat generating component; and on activation of the reset device, to reset the timer to the predetermined cooking time corresponding to the setting of the heat controller, terminate the alarm signal after the cooking time expires, and reconnect the energy source with the heat generating component after the alarm time expires.

When applied to the example of a conventional stove 1 with four burners 6 and an oven 7, the cooking appliance can be described in general as having a plurality of heat generating components each in communication with a corresponding heat controller. The safety device in a case with multiple burners 6 and oven 7 has a plurality of corresponding timers each in communication with the corresponding heat controller for each heat generating component. The microprocessor of the electronic control system is configured to: retrieve data from the memory storage device to set the predetermined cooking time for each timer and heat controller corresponding to the setting of each heat controller; activate each timer to count down the corresponding predetermined cooking time; determine the minimum predetermined cooking time by comparing the corresponding predetermined cooking time for each timer; activate the alarm unit, after the minimum cooking time expires, to communicate an alarm signal for a predetermined alarm time; and on activation of the reset device, to reset each timer to the predetermined cooking time corresponding to the setting of the corresponding heat controller, terminate the alarm signal after the minimum cooking time expires, and reconnect the energy source with the heat generating component after the alarm time expires.

Therefore an advantage of the safety timer device is that multiple heat controllers can be monitored electronically and the software can determine which burner requires the least allowable cooking time and set the alarm accordingly. Further the user can attend to cooking by making contact with any timer dial 2 to reset the safety timer.

Although the above description relates to a specific preferred embodiment as presently contemplated by the inventors, it will be understood that the invention in its broad aspect includes mechanical and functional equivalents of the elements described herein.

We claim:

1. A safety timer device for a cooking appliance connected to an energy source, the cooking appliance having a heat generating component in communication with a heat controlling device, the safety timer device comprising:

a timer in communication with the heat controlling device, the timer configured to count down a predetermined cooking time;

an alarm unit in communication with the timer, the alarm unit configured to communicate an alarm signal for a predetermined alarm time after the cooking time expires;

an ON/OFF device in communication with the timer, the energy source and the heat generating component, the ON/OFF device configured to disconnect the energy source from the heat generating component after the alarm time expires; and a reset device in communication with the timer, the alarm unit and the ON/OFF device, the reset device configured to reset the timer to the predetermined cooking time, terminate the alarm signal after the cooking time expires, and reconnect the energy source with the heat generating component, wherein the heat controlling device has a plurality of heat output settings to vary heat output of the heart generating component, and the timer has a corresponding plurality of predetermined cooking times, each predetermined cooking time corresponding to one of the heat output settings.

2. The safety timer device according to claim 1 wherein the heat controlling device comprises a removable rotary handle having a rotary position sensor, and the timer communicates with the heat controlling device to determine the heat output setting from a heat setting position sensed by the rotary position sensor.

3. The safety timer device according to claim 2 wherein the reset device communicates with a touch sensitive switch on the rotary handle.

4. The safety timer device according to claim 1 wherein the predetermined cooking times are in the range of 4 to 60 minutes.

5. The safety timer device according to claim 1 wherein the alarm signal is selected from the group consisting of: an audible alarm signal; a visual alarm signal; and a vibratory alarm signal.

6. The safety timer device according to claim 1 wherein the alarm signal comprises a plurality of alarm signal stages each stage having an alarm stage time duration, wherein the sum of all alarm stage durations equals the predetermined alarm time.

7. The safety timer device according to claim 1 wherein at least one of: the timer and alarm unit; the timer and the ON/OFF device; the timer and the reset device; the reset device and the alarm unit; and the reset device and the ON/OFF device, are configured to communicate wirelessly.

8. The safety timer device according to claim 1 wherein at least one of: the timer and alarm unit; the timer and the ON/OFF device; the timer and the reset device; the reset device and the alarm unit; and the reset device and the ON/OFF device, are configured to communicate mechanically.

9. The safety device according to claim 1 wherein the energy source comprises an electrical power supply and the ON/OFF device comprises an electrical switch.

10. The safety device according to claim 9 wherein the ON/OFF device comprises a housing with an electrical outlet on a first face and an electrical plug on a second face.

11. The safety device according to claim 1 wherein the energy source comprises a fuel gas supply and the ON/OFF device comprises a gas valve.

12. The safety device according to claim 11 wherein the gas valve comprises a solenoid valve.

13. A safety timer device for a cooking appliance connected to an energy source, the cooking appliance having a heat generating component in communication with a heat controlling device, the heat controlling device having a plurality of settings to vary heat output of the heat generating component, the safety timer device comprising:
a timer in communication with the heat controlling device;
an alarm unit in communication with the timer;
an ON/OFF device in communication with the timer, the energy source and the heat generating component;
a reset device in communication with the timer, the alarm unit and the ON/OFF device; and
an electronic control system comprising at least one microprocessor configured to:
detect when the heat controlling device is activated;
sense the setting of the heat controlling device;
retrieve data from a memory storage device to set a predetermined cooking time corresponding to the setting of the heat controlling device;
activate the timer to count down the predetermined cooking time;
activate the alarm unit, after the cooking time expires, to communicate an alarm signal for a predetermined alarm time;
activate the ON/OFF device, after the alarm time expires, to disconnect the energy source from the heat generating component; and
on activation of the reset device, to reset the timer to the predetermined cooking time corresponding to the setting of the heat controlling device, terminate the alarm signal, and reconnect the energy source with the heat generating component.

14. The safety device according to claim 13 wherein the cooking appliance has a plurality of heat generating components each in communication with a corresponding heat controlling device;
wherein the safety device further comprises a plurality of corresponding timers each in communication with the corresponding heat controlling device for one of the plurality of heat generating components; and
wherein the at least one microprocessor of the electronic control system is configured to:
retrieve data from the memory storage device to set the predetermined cooking time for each timer and heat controlling device corresponding to the setting of each heat controlling device;
activate each timer to count down the corresponding predetermined cooking time;
determine a minimum predetermined cooking time by comparing the corresponding predetermined cooking time for each timer;
activate the alarm unit, after the minimum cooking time expires, to communicate an alarm signal for a predetermined alarm time; and
on activation of the reset device, to reset each timer to the predetermined cooking time corresponding to the setting of the corresponding heat controlling device, terminate the alarm signal after the minimum cooking time expires, and reconnect the energy source with the heat generating component after the alarm time expires.

15. The safety device according to claim 13 wherein the heat controlling device comprises a removable rotary handle having a rotary position sensor, and the at least one microprocessor of the electronic control system is configured to:
detect a first angle with the rotary position sensor;
save the first angle in the memory storage device corresponding to an OFF setting;
detect a second angle with the rotary position sensor; and
save the second angle in the memory storage device corresponding to a HI setting.

16. The safety device according to claim 15 wherein the at least one microprocessor of the electronic control system is configured to extrapolate between the OFF setting and the HI setting to determine the predetermined cooking time corresponding to a setting therebetween.

17. The safety device according to claim 15 wherein the at least one microprocessor of the electronic control system is configured to:
detect a third angle with the rotary position sensor; and
save the third angle in the memory storage device corresponding to a LO setting.

18. The safety device according to claim 13 wherein the heat controlling device comprises a removable rotary handle having a rotary position sensor, and the at least one microprocessor of the electronic control system is configured to:
detect a heat setting position with the rotary position sensor; and
sense the setting of the heat controlling device using the detected heat setting position.

19. The safety device according to claim 13, wherein the heat controlling device comprises a touch sensitive switch, and the at least one microprocessor of the electronic control system is configured to detect activation of the reset device using the touch sensitive switch.

* * * * *